US010839687B2

(12) United States Patent
Keller et al.

(10) Patent No.: US 10,839,687 B2
(45) **Date of Patent: *Nov. 17, 2020**

(54) GEN II METER SYSTEM WITH MULTIPLE PROCESSORS, MULTIPLE DETECTION SENSOR TYPES, FAULT TOLERANCE METHODS, POWER SHARING AND MULTIPLE USER INTERFACE METHODS

(71) Applicant: fybr, Chesterfield, MO (US)

(72) Inventors: Scott Keller, Still River, MA (US); Chris Krstanovic, Windham, NH (US); Tom Swiedler, Roswell, GA (US); David Fasciano, Roswell, GA (US); Eric Groft, Somerville, MA (US)

(73) Assignee: fybr, LLC, Chesterfield, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/679,610

(22) Filed: Apr. 6, 2015

(65) Prior Publication Data

US 2015/0213717 A1 Jul. 30, 2015

Related U.S. Application Data

(63) Continuation of application No. 12/801,987, filed on Jul. 7, 2010, now Pat. No. 9,000,949.

(Continued)

(51) Int. Cl.

*B60Q 1/48* (2006.01)
*G08G 1/14* (2006.01)

(Continued)

(52) U.S. Cl.

CPC ............. *G08G 1/144* (2013.01); *G07B 15/02* (2013.01); *G07F 17/246* (2013.01)

(58) Field of Classification Search

CPC ........ G07B 15/02; G07F 17/246; G08G 1/144

See application file for complete search history.

(56) References Cited

U.S. PATENT DOCUMENTS 4,884,059 A 11/1989 Shapiro
5,121,390 A 6/1992 Farrell et al.

(Continued)

FOREIGN PATENT DOCUMENTS

EP 2221770 8/2010
EP 2278565 1/2011

(Continued)

OTHER PUBLICATIONS

Wikipedia. "Node (networking)" Wikimedia Foundation, Inc. Feb. 16, 2014. http://en.wikipedia.org/wiki/node_ (networking).

(Continued)

*Primary Examiner* — Quang Pham

(74) *Attorney, Agent, or Firm* — Perman & Green, LLP

(57) ABSTRACT

A parking space monitoring system, with multiple microprocessors for handling various parking space management conditions, including at least one of the following conditions: (1) Space Occupancy (vehicle detection); (2) Parking Meter Status; (3) Display of Parking Policy to Motorists; (3) Motorist User Interactions; (4) Maintenance User Interactions; (5) Radio Communications with a Central management system and Network; and (6) Coordination of the operation between various ones of the microprocessors.

12 Claims, 4 Drawing Sheets

Related U.S. Application Data

(60) Provisional application No. 61/213,752, filed on Jul. 10, 2009.

(51) Int. Cl.

| | |
|---|---|
| ***G07B 15/02*** | (2011.01) |
| ***G07F 17/24*** | (2006.01) |

(56) References Cited

U.S. PATENT DOCUMENTS

| | | | | |
|---|---|---|---|---|
| 5,721,737 | A | 2/1998 | Radjabi et al. | |
| 5,774,111 | A | 6/1998 | Lecland et al. | |
| 5,845,268 | A | 12/1998 | Moore | |
| 5,852,411 | A | 12/1998 | Jacobs et al. | |
| 5,910,782 | A | 6/1999 | Schmitt et al. | |
| 6,037,880 | A | 3/2000 | Manion | |
| 6,055,581 | A | 4/2000 | Berglund et al. | |
| 6,111,522 | A | 8/2000 | Hiltz | |
| 6,144,927 | A | 11/2000 | Grill et al. | |
| 6,147,624 | A | 11/2000 | Clapper | |
| 6,323,785 | B1 | 11/2001 | Nickell et al. | |
| 6,340,935 | B1 | 1/2002 | Hall | |
| 6,344,806 | B1 | 2/2002 | Katz | |
| 6,426,708 | B1 | 7/2002 | Trajkovic et al. | |
| 6,477,539 | B1 | 11/2002 | Smith | |
| 6,559,776 | B2 * | 5/2003 | Katz | G07B 15/02 340/932.2 |
| 6,885,311 | B2 | 4/2005 | Howard et al. | |
| 6,927,700 | B1 | 8/2005 | Quinn | |
| 6,970,101 | B1 * | 11/2005 | Squire | G08G 1/14 340/309.16 |
| 7,104,447 | B1 | 9/2006 | Lopez et al. | |
| 7,230,535 | B2 | 6/2007 | Jackson et al. | |
| 7,768,426 | B2 | 8/2010 | Groft | |
| 7,899,583 | B2 * | 3/2011 | Mendelson | G08G 1/14 340/932.2 |
| 8,199,001 | B2 | 6/2012 | Verbil | |
| 8,306,734 | B2 | 11/2012 | Mathews | |
| 8,385,840 | B2 | 2/2013 | King | |
| 8,624,756 | B2 | 1/2014 | Ganot | |
| 8,671,014 | B2 | 3/2014 | Stefik et al. | |
| 2002/0007291 | A1 * | 1/2002 | Miller | G06Q 10/02 705/5 |
| 2002/0109609 | A1 * | 8/2002 | Potter, Sr. | G07C 1/30 340/932.2 |
| 2002/0111768 | A1 * | 8/2002 | Ghorayeb | G07B 15/02 702/178 |
| 2002/0120728 | A1 * | 8/2002 | Braatz | H04L 29/06 709/223 |
| 2002/0186662 | A1 | 12/2002 | Tomassetti et al. | |
| 2003/0132840 | A1 * | 7/2003 | Bahar | G06Q 20/127 340/541 |
| 2003/0146852 | A1 * | 8/2003 | O'Dell | G07B 15/02 340/932.2 |
| 2004/0068434 | A1 | 4/2004 | Kanekon | |
| 2004/0094619 | A1 | 5/2004 | Silberberg | |
| 2004/0146070 | A1 | 7/2004 | Blackmore et al. | |
| 2004/0221196 | A1 | 11/2004 | Datta | |
| 2004/0252034 | A1 * | 12/2004 | Slemmer | G08G 1/14 340/932.2 |
| 2005/0066119 | A1 | 3/2005 | Azimi | |
| 2005/0099320 | A1 | 5/2005 | Nath et al. | |
| 2005/0104723 | A1 * | 5/2005 | Mandy | G08B 26/007 340/506 |
| 2005/0168352 | A1 * | 8/2005 | Tomer | G06Q 30/0284 340/932.2 |
| 2006/0020487 | A1 * | 1/2006 | Spittel | G06Q 10/02 705/5 |
| 2006/0116892 | A1 * | 6/2006 | Grimes | G06Q 10/02 705/5 |
| 2006/0152349 | A1 | 7/2006 | Ratnaker | |
| 2006/0203709 | A1 | 9/2006 | Laroia et al. | |
| 2007/0061065 | A2 | 3/2007 | Krikelis | |
| 2007/0096943 | A1 | 5/2007 | Arnold et al. | |
| 2007/0171069 | A1 | 7/2007 | Allen | |
| 2007/0210935 | A1 * | 9/2007 | Yost | G07B 15/02 340/932.2 |
| 2007/0285281 | A1 | 12/2007 | Welch | |
| 2007/0293157 | A1 | 12/2007 | Haartsen et al. | |
| 2007/0293232 | A1 | 12/2007 | Nonaka | |
| 2008/0066119 | A1 | 3/2008 | Azimi | |
| 2008/0127325 | A1 | 5/2008 | Ebrom et al. | |
| 2008/0165003 | A1 | 7/2008 | Graichen et al. | |
| 2008/0165030 | A1 | 7/2008 | Kuo et al. | |
| 2008/0231470 | A1 | 9/2008 | Loli | |
| 2008/0235082 | A1 * | 9/2008 | Zanotti | G07B 15/02 705/13 |
| 2008/0238715 | A1 | 10/2008 | Cheng et al. | |
| 2008/0277468 | A1 * | 11/2008 | Mitschele | G06Q 20/0652 235/384 |
| 2008/0287070 | A1 | 11/2008 | King | |
| 2008/0291054 | A1 | 11/2008 | Groft | |
| 2009/0086762 | A1 | 4/2009 | Kugler | |
| 2009/0109062 | A1 | 4/2009 | An | |
| 2009/0132070 | A1 | 5/2009 | Ebrom et al. | |
| 2009/0182868 | A1 | 7/2009 | McFate et al. | |
| 2009/0207003 | A1 | 8/2009 | Brekke et al. | |
| 2009/0231129 | A1 | 9/2009 | Edwards et al. | |
| 2009/0267732 | A1 * | 10/2009 | Chauvin | G06Q 20/32 340/5.53 |
| 2009/0309761 | A1 * | 12/2009 | Nagase | G01C 21/3617 340/932.2 |
| 2010/0026521 | A1 | 2/2010 | Noel | |
| 2010/0030708 | A1 | 2/2010 | Ward | |
| 2010/0191584 | A1 * | 7/2010 | Fraser | G06Q 30/0207 705/13 |
| 2010/0328104 | A1 | 12/2010 | Groft | |
| 2011/0062230 | A1 * | 3/2011 | Ward, II | G06Q 20/105 235/377 |
| 2011/0099126 | A1 * | 4/2011 | Belani | G06Q 30/0284 705/418 |
| 2011/0102197 | A1 | 5/2011 | Herwich | |
| 2011/0131154 | A1 * | 6/2011 | Faber | G01C 21/32 705/418 |
| 2011/0133958 | A1 * | 6/2011 | Carboon | G07C 5/006 340/932.2 |
| 2011/0140656 | A1 * | 6/2011 | Starr | B60L 11/1816 320/109 |
| 2011/0205087 | A1 | 8/2011 | Kell et al. | |
| 2011/0288895 | A1 * | 11/2011 | Perez, Jr. | G06Q 10/06 705/7.12 |

FOREIGN PATENT DOCUMENTS

| | | |
|---|---|---|
| KR | 20070060373 | 6/2007 |
| WO | 2007027818 | 3/2007 |

OTHER PUBLICATIONS

Partial European Search Report, EP Application No. 10250201, dated Jun. 16, 2013.

Rebeling Plastics, "Thermoplastics—Polycarbonate (LEXAN)", accessed Mar. 23, 2015, published on or before Sep. 13, 2007, all pages pertinent, <https://web.archive.org/web/20070913190802/ http://www.reblingplastics.com/ polycarbonate-lexan.htm>.

* cited by examiner

GEN II METER SYSTEM WITH MULTIPLE PROCESSORS, MULTIPLE DETECTION SENSOR TYPES, FAULT TOLERANCE METHODS, POWER SHARING AND MULTIPLE USER INTERFACE METHODS

CROSS REFERENCE TO RELATED APPLICATIONS

This application is a continuation of U.S. patent application Ser. No. 12/801,987 filed on 7 Jul. 2010 and claims the benefit of U.S. provisional patent application No. 61/213,752, filed on 10 Jul. 2009, the disclosures of which are incorporated herein by reference in their entireties.

BACKGROUND

Field

In a system such as the Gen II Meter System (Provisional Patent Application Ser. No. 61/202,201, Filed February 2009) built with multiple processors contained in a single node provides internal monitoring of the operability of all units. An alphanumeric identifying message ID for each message is transmitted from a component to identify intermittent and other communication errors such as consistently "lost" packets of information within a RAM system (patent application Ser. No. 11/802,244, filed 21 May 2007) for Parking Management. An alphanumeric identifying message ID for each message transmitted from a component to identify intermittent and other communication errors such as consistently "lost" packets of information within a RAM system for Parking Management. An alphanumeric message Id confirms message delivery between radio network components in the RAM system for parking. The alphanumeric message ID confirms message delivery between radio network components in the RAM system for parking. The above alphanumeric message ID confirms message delivery between radio network components in the RAM system for parking. The above alphanumeric message IF confirms message delivery between radio network components in the RAM system for parking. A switching mechanism is used as a method of time stamping Parking Meter collections and sending sets of commands either directly from handheld implements or through a radio network.

The provisional patent application Ser. No. 61/202,201 relates to multiple task specific processors such as an Application Processor, a Meter Controller and a Radio Processor all controlled via a shared SPI bus and using rechargeable batteries and solar power sources for controlling and monitoring a vehicle parking system.

The invention entitled: Parking System Employing RAM Techniques, Ser. No. 11/802,244, filed 21 May 2007 which relates to the management of vehicle parking systems and in particular to such systems using remote management techniques for enhancing management efficiency and to provide solutions to the parking system that could not otherwise be managed by (1) sensing, collecting, recording and displaying data regarding all aspects of the environment pertaining to the parking system, (2) analyzing the data collected to create actionable outputs responsive to the needs of the public and the management of the parking system; (3) communicating with the various parking system components, and (4) receiving feedback to perform requested operations for the parking system.

SUMMARY OF THE INVENTION

The system of the invention with the GEN II Meter System uses multiple processors contained in a single node to provide internal monitoring of the operability of all units in the system. The invention uses an embedded power control unit such as the one included in the GEN II Meter System to reset any non-responsive processor in the individual node when one of the processors is found to be non-responsive.

Within a complex system of microprocessors such as the Gen II Meter System, individual processors may become disabled by undiscovered programming bugs or unforeseen circumstances. A disabled microprocessor would render the system incapable of providing accurate data—if any data at all is able to be transmitted. In order to correct such a failure, a maintenance worker would have to be dispatched to correct the problem on-site. This results in a cost in terms of labor, fuel, and/or lost revenues at the meter. The problem could also mean that citations are contested by motorists resulting in lost revenues from citations as well as costs in terms of personnel and legal fees to adjudicate such citations.

Having multiple processors in the same piece of electronic equipment not only saves power, but also allows independent operation of each unit so that if anyone processor enters a disabled state, the remaining processors remain operable. Taking advantage of this redundancy, the operable processors can periodically check the operability of the other processors in its proximity. If it is found that one of the proximate processors is non-responsive, the operable processor can re-initialize the non-responsive one by using a command to the power control unit which switches power to the non-responsive processor off and then back-on. This re-initialization can often restore the non-responsive processor to normal operation.

Use of an alphanumeric identifying message ID for each message transmitted from a component to identify intermittent and other communication errors such as consistently "lost" packets of information within a RAM system for Parking Management.

Wireless communication systems, such as that envisioned in the RAM system for Parking are subject to lost message packets. This is an intermittent condition that may simply be a one-time issue. Similarly, "lost" packets may also indicate a more significant problem. The difference can be problematic to distinguish.

A daily examination of data received for each radio asset is performed to determine the percentage of packets lost over the last day. The test should keys off the embedded sequence number associated with each radio message generated by a radio. These sequence numbers exist within a predefined range and increment from zero to the upper range limit with each message sent. If a message sequence number is equal to the upper range limit for one message, the next message will have a sequence number of zero and restart the incremental process. This is considered when processing new messages. If an expected sequence number is not received within 10 messages, it is considered lost. If the resulting lost packet rate is more than a pre-defined percentage of total messages expected ("lost" packets+received packets), an alarm state can be triggered and the problem investigated.

Use of the above alphanumeric message ID to confirm message delivery between radio network components in the RAM system for Parking. In systems such as the RAM system for Parking Management, communications between radio network components can be interrupted. Additionally, these messages are often transmitted after a previous message is transmitted. If multiple messages are sent from one originating radio, but only a portion of them are received completely, it isn't possible for the originating radio to re-send the interrupted message without an indication as to which message was interrupted This results in either the need to transmit all the messages again—causing increased radio traffic, interference and power drain- or the need to drop the packet and create data inaccuracies.

The receiving radio sends an acknowledgement message back to the originating radio with each message received successfully including the alphanumeric message ID. Only upon receipt of the acknowledgement record or aging algorithm does the originating radio discard the message from the queue of messages to send. If the originating radio receives no acknowledgement message or instead receives a No-Acknowledgement message with a matching message ID, it re-sends the message. This ensures that all messages have the maximum chance to be received from the originating device to the Command and Control Interface in the RAM System for Parking Management.

Use of an additional battery to those described in the GEN II Meter System to supplement or replace traditional non-rechargeable batteries used in standard electronic parking meters, While the Gen II Meter System can generate significantly more power than is needed by the radio detection and application processor systems, many electronic parking meters only have connections to allow regular, non-rechargeable batteries to connect to the meter for the purpose of powering them. Additionally, standard electronic parking meters burn through batteries within 18 months or even in as little as 6 months. This results in the need for maintenance personnel to be mobilized to visit each meter regularly to replace the batteries used to power the mechanisms. Each replacement costs those managing parking operations in terms of labor, fuel and battery costs. Additionally, replacement of batteries results in unusable discharged batteries that need to be disposed. This disposal is costly due to environmental effects of disposing batteries made of toxic chemicals. The GEN II Meter System can be paired with a rechargeable battery fitted with appropriate connection to allow the rechargeable battery to connect to the meter's electronics so as to either supplement or replace the currently used non-rechargeable batteries. Use of this power greatly reduces or even negates the number of battery replacements a manager of a parking operation would need to replace meter mechanism batteries as well as the incursion of the costs related to battery replacement.

Use of meters such as those described in the Gen II Meter System and the handheld or in-vehicle mounted mobile computers connected to a central Command and Control Interface as described in the RAM System for Parking to produce a ranking of both groups of spaces and individual spaces for display on mobile data terminals in ranked order for use by enforcement, maintenance and collections personnel.

Currently enforcement, maintenance and collections are performed either by following established routes and seeking out specific problems. Other methods of deployment include using historical records to determine area of high probability of violations, in-operable meters or meters nearing capacity. The current methods of managing these assets incur costs in terms of labor, fuel and lost revenues due to the inefficiencies inherent in routine inspection methods GPS systems embedded in either the handheld or in-mounted mobile computers or vehicles used by enforcement, maintenance and collections personnel can provide the specific locations of the field level workers back to the command and control interface as described in the RAM System for Parking. The proximity of meter operation exceptions (violations, meter errors or low meter coin capacity) to those responsible for addressing the exceptions can be added to other operational elements (number of additional exceptions in that area, revenue potential, business goals or other criteria) to rank either individual spaces or even collections of meters for attention by field level personnel. By deploying personnel to problems by exception, great efficiency can be achieved. Not only are labor and fuel costs reduced, but equipment repairs are completed more quickly-increasing uptime. Additionally, the amount of time needed to identify and cite vibrations is greatly reduced resulting in greater numbers of citations that can be issued.

Use of data received from the handheld or in-vehicle mounted mobile computers described in the RAM system for Parking to show proximity of field level personnel to specific parking spaces with exceptions requiring attention of those workers.

Supervisor personnel currently do not have an easy way of determining where their field level personnel are at a given point of the day. Supervisors can contact personnel and ask for their location. This method is not only error prone, but also can't be confirmed. Errors in dispatching personnel to the nearest locations can result in inefficient routing. That, in turn, creates additional and unnecessary fuel and labor costs as well as lost revenue opportunities due to inoperable equipment or not cited violations.

GPS systems embedded in either the mobile computers or vehicles use by enforcement, maintenance and collections personnel can provide the specific location of the field level worker back to the command and control interface as described in the RAM system for Parking. This information can be displayed on the interfaces of the command and control interface portal. Various icons can track the handheld unit and any equipped vehicle separately. The history of location information can be displayed as a collection of points and the timestamps from each reading used to illustrate the route taken by the field level worker and/or his vehicle. Different icons can be used to distinguish between handheld tracking and vehicle tracking on the same map as the stationary parking meter assets. This gives the supervisors a confirmed history of each worker as well as a confirmed location of that worker to current issues in near real-time. By deploying personnel to problems by proximity, great efficiency can be achieved. Not only are labor and fuel costs reduced, but equipment repairs are completed more quickly-increasing uptime. Additionally, the amount of time needed to identify and cite violations is greatly reduced resulting in greater numbers of citations than can be issued.

Combining the data used in the two preceding paragraphs with known information regarding charged parking rates, parking demand, turnover, parking time limits, violation type, violation fine levels, historical violation durations and other metrics to rank tasks for field workers and the application of an artificial intelligence to permit a system to uniquely identify the highest assay opportunity—taking into account the worker's location as well as a ranked priority of the other factors known from current and historical data, where the historical data includes historical parking space management characteristics and historical various parking space conditions which together may define the dynamic priority of near real time exceptions from predetermined parking space management characteristics of the parking space and the exceptions may be actionable in near real time based on the historical geographical locations of the mobile computer and the field level workers.

Parking management activities are complex to prioritize. First, parking management goals can include revenue maximization, space availability maximization or many other types of goals. Second, the environment in which parking management equipment is used is one that is constantly changing. Current methods of identifying exceptions in compliance, operability or vault capacity cannot provide the necessary information to guide the workers in the field to the tasks most directed toward the accomplishments of those goals.

The command and control interface within the Ram system for parking management can be configured with flexible algorithms that score each exception on parameters that match the management goals of the parking manager. These inputs can include but are not limited to, the number of nearby exceptions, the rate of the space per hour, the number of occupants normally visiting that space per day, the average duration of violations in that space, the average duration of stay per motorist, the fines for each type of violation and the type of violation being observed. Each of these items can be weighted in a manner that reflects the goals of the parking manager to rank each exception so that each exception can be addressed in a way that most applies to the goal of the parking manager. This process is automated through algorithms so that the priority of tasks can be dynamic—based on the ever-changing environment being managed.

Reed relay as a method of time stamping Parking Meter collections and sending sets of commands either directly from handheld computers or through the network. A meter system like the GEN II Meter System requires an event-triggered form of communication in order to avoid overuse of a limited battery power. This prevents many on-demand functions from being initiated such as immediate posting of time by city personnel or initialization of transmission of meter audit records at the time collections are taken.

The use a Reed Relay or other form of switch to wake the meter node allows any number of instructions to be executed on demand. The waking of the meter node can be used to initiate a pre-established set of commands possibly including communication to a collector or gateway to receive data and commands awaiting it there and/or communicate to a proximate handheld to similarly receive data and commands awaiting it there. Another possible command set can be used to trigger the meter to transmit its audit information for later comparison to collection receipts. Additionally, the command set can be used to have the meter node await customized instructions from the handheld device carried by the field worker. These command sets would be customized to the activity being performed by the field worker present at that time.

Loop Puck

The use of inductance loops can often require the running of lead wires from many spaces to a common point where the monitoring of a plurality of spaces is performed. This consolidated point is often a long distance away from the individual spaces and the distance can cause higher installation costs and—the possibility of breakage. Additionally, the running of many wire leads from multiple spaces to a common location can in some situations cause cross-talk—the confusion of a signal on one line to interfere with the communications of the signal on another line.

A small detection unit and radio device of the GEN II design can be packaged in a small container. This unit can be connected to the loop leads and installed in a cored-out area near the loop itself. The unit would then transmit to a central collector as in the GEN II Meter System, thereby negating the need to cut long channels to consolidate the loop leads in a single location.

List of Internal Diagnostics and Messaging

The Gen II Meter System is a complex set of subsystems. A failure in any one of these systems may affect the operability of the entire system monitoring that space. Without proper monitoring data, timely trouble-shooting and repair is difficult.

The GEN II Meter System employs self-monitoring protocols that cover the following areas of its operation:

(1) Checksum error
(2) Link level protocol error
(3) Transport level protocol error
(4) Application level protocol error
(5) Invalid transport address
(6) Invalid request type
(7) Invalid data in request
(8) Invalid count was specified in a request
(9) Verify error (FUP only)
(10) No transfer buffer available
(11) No memory buffer available
(12) Invalid message length
(13) Error accessing real time clock
(14) Invalid chip Id
(15) Not active
(16) Device is busy
(17) Invalid sequence number
(18) No response to application level request
(19) Device cannot accept input—retry later
(20) Parking meter error: Protocol error
(21) Parking meter error: invalid acknowledgement character received from parking meter
(22) Parking meter error: Listen pulse error
(23) Parking meter error: Meter mode character error
(24) Parking meter error: Parking meter has been disabled
(25) Parking meter error: Invalid event pointer
(26) Parking meter error: Access denied
(27) File system error: Directory is full
(28) File system error: Storage is full
(29) File system error: Bad link in file
(30) File system error: No file is open (in for request operation)
(31) File system error: Invalid data count
(32) File system error: End of file seen
(33) File system error: File not found
(34) Invalid sequence number
(35) Invalid format in image file
(36) Invalid image data
(37) Invalid address for memory contents
(38) Invalid image format
(39) Invalid transaction protocol (reported by bootstrap)
(40) Verification error
(41) Loaded application code is not valid, cannot be started These error codes are communicated to allow specific action to be taken to repair any problem occurring in the system in a timely manner.

DETAILED DESCRIPTION

Figure 1:
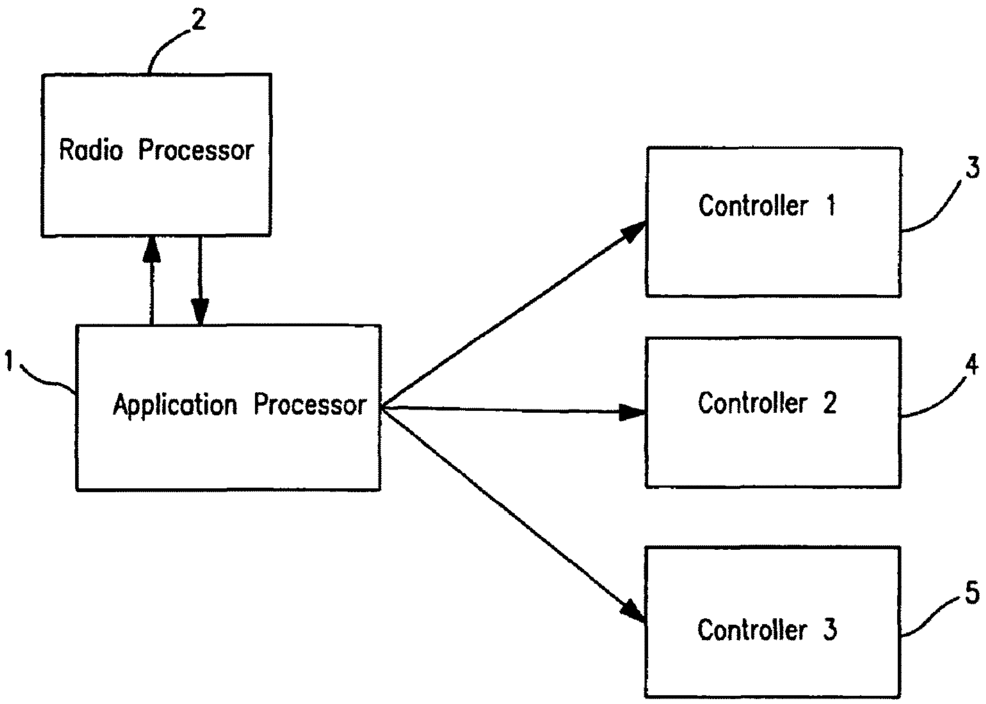
FIG. 1 shows the inter-relationships among a Radio Processor, Application Processor and several controllers.

In FIG. 1, the Application Processor of the GEN II System (1) queries the Radio Processor (2) and the entire plurality of other controllers (3, 4, 5) for their operability status on a periodic basis. If the status of any of the individual components is deemed unresponsive or fatal to the ongoing operation of that component, the Application Processor initiates a re-initialization of the component. Similarly, the Radio Processor (2) periodically queries the Application Processor (1) for its operational status. If the Application Processor is deemed unresponsive, it can be re-initialized by the Radio Processor.

Figure 2:
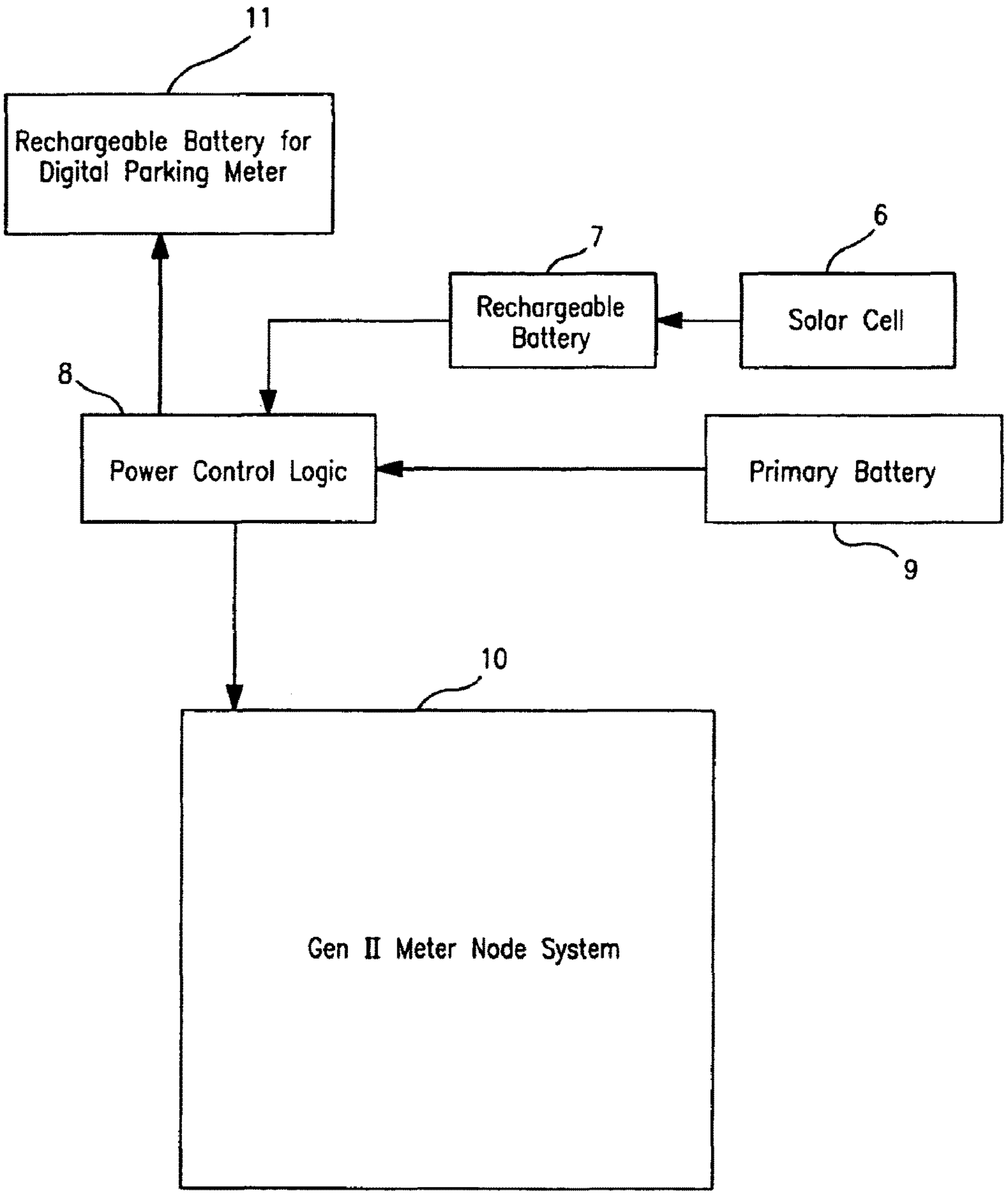
FIG. 2 is a block diagrammatic representation of the multiple processor system of the invention.

In FIG. 2, the Solar Cell (6) provides an electrical charge to the connected Rechargeable Battery (7) to maintain as full a charge as possible for a long a duration as possible. The Power Logic (8) then monitors the available power on the Rechargeable Battery (7) to determine if it is supplying enough power to supply the GEN II Meter Node System (10). If it is not able to do so, the Power Control Logic (8) switches the power draw over to the Primary Battery (9) to ensure ongoing operation of the GEN II Meter Node System (10). In the cases where the Power Control Logic (8) is drawing power from the Rechargeable Battery (7), the Power Control Logic (8) also determines if excess power is available from the solar supplied Rechargeable Battery (7). If excess power is being generated, the Power Control Logic (8) allows the excess power to be supplied to the Rechargeable Battery (7) for Digital Parking Meter (11). This battery is added to a primary battery connected to the Digital Parking M (11) in the GEN II Meter System to supply the necessary power for the operation of that device.

Figure 3:
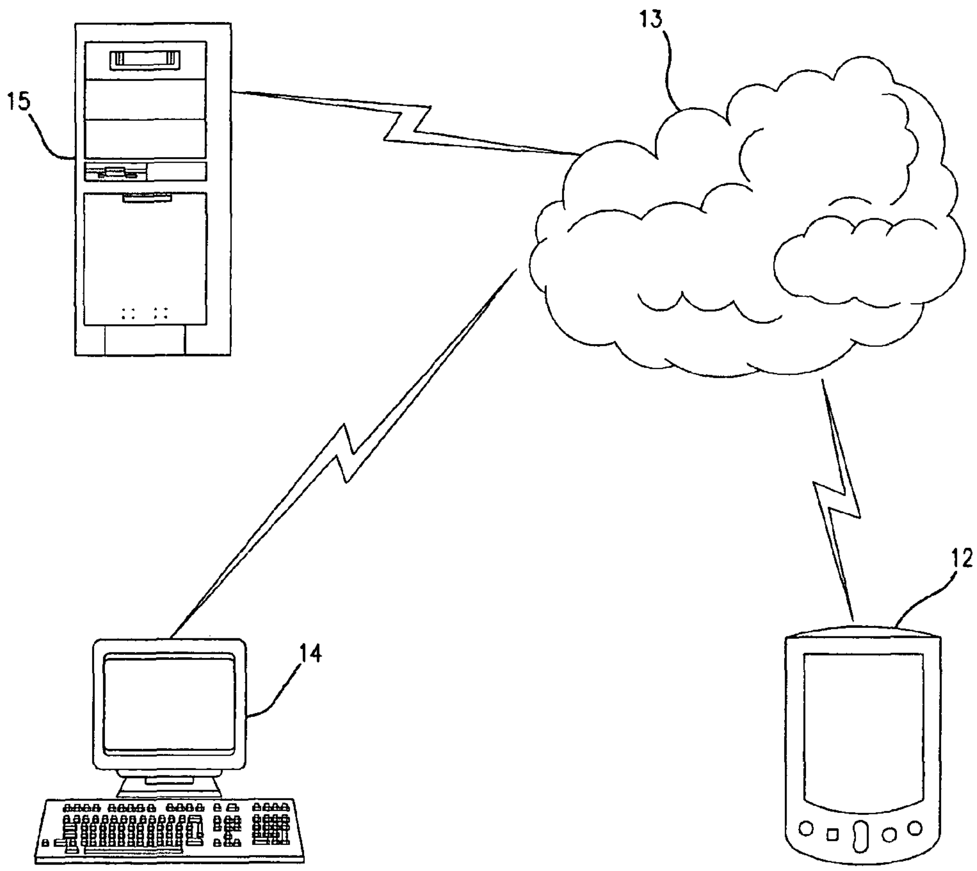
FIG. 3 illustrates a Global Positioning Satellite receiver-equipped computer connected to the Internet and a Central Command and Controller Interface (CCCI) for measuring the distance between a Mobile Computer and combining that distance data with other data from the CCCI for generating outputs via the internet to provide supervisor access by means of a standard computer.

In FIG. 3, the Global Positioning Satellite (GPS) Receiver-Equipped Mobile Computer (12) is connected to the Internet (13). This device transmits geographical coordinates on regular intervals by way of the Internet (13) to the Central Command and Control Interface (15) which then can measure the distance between the Mobile Computer (12) (and the operator, the field worker) and issues for which operator is responsible. The distance is then combined with the other data available in a typical installation of a Command and Control Interface (CCI), data such as the amount of fines, violation time, time out-of-service, turnover rates to score each work item based on the user's predefined rankings of what attributes are most important. The ranked results of work items is then returned to the mobile computer by way of the internet and the operator of that mobile computer can clearly identify those issues that are closest and of highest priority. Additionally, supervisor access combining data regarding the location of field personnel and relevant issues by way of a Standard Computer (14) connected to the Internet (13). This standard PC (12) connects to the CCI to retrieve maps indicating the location of both the remote staff and the work items to ensure that work is being done in a timely way or manually re-direct personnel to special problems most effectively.

Figure 4:
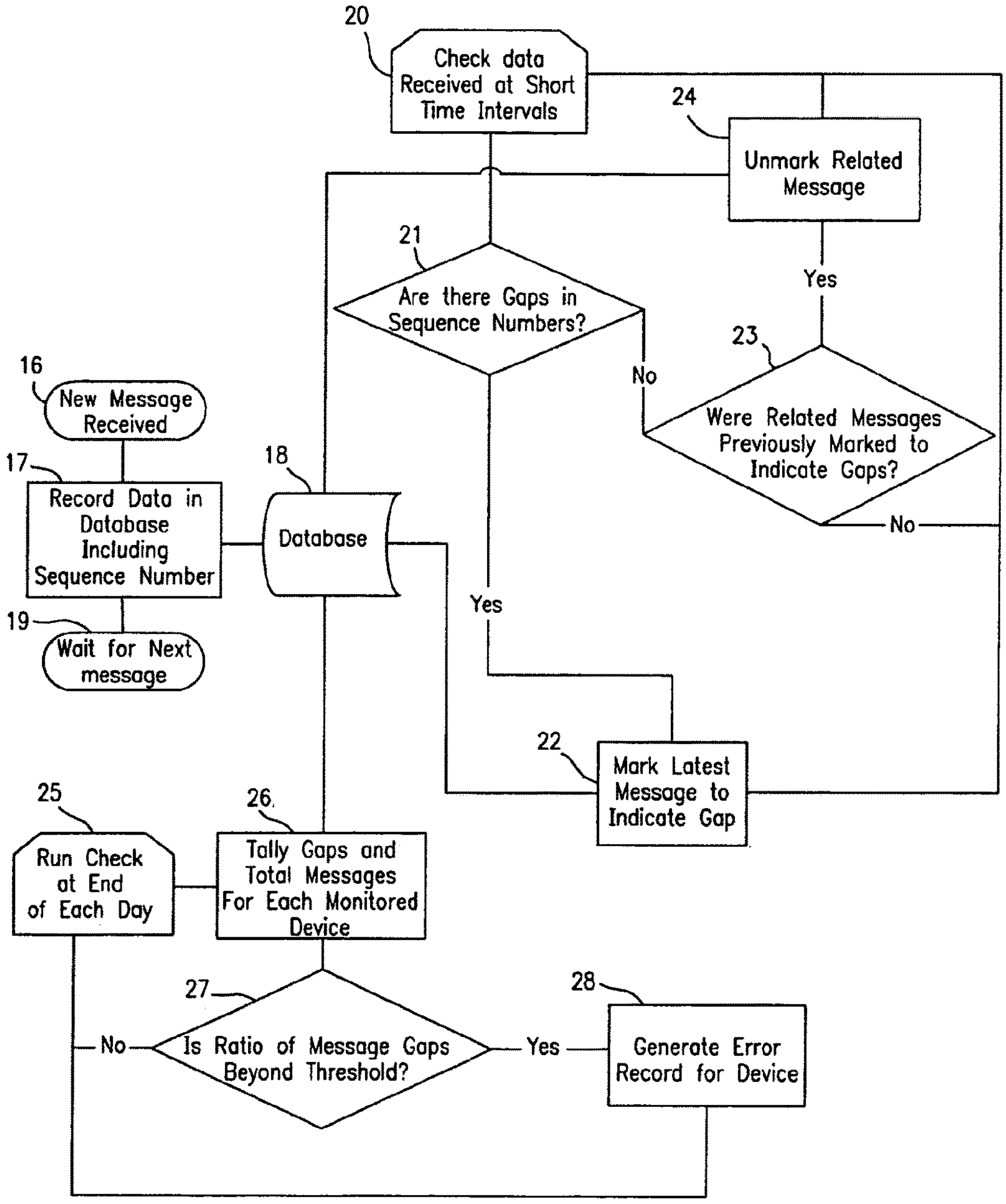
FIG. 4 illustrates a process for interacting with a Central Database to independently monitor the viability of communications from the Gen II Meter System of FIG. 2.

In FIG. 4, three processes independently interact with a Central Database (18) to monitor the viability of communications from each GEN II Meter Node and its supporting network communications equipment. When new messages are received at (16), they are recorded in the database along with a message sequence number (17). Once the database has been updated, the message listener process waits for the next message to process at (19). Independently thereof, a messaging monitoring process loops through a repeated process at regular intervals (20). The first step of the process (21) checks the records received for each space and identify if any gaps exist. If gaps in the records are found, they are indicated by marking the message record immediately after the sequence number gap as having a skipped message following the transmission (22) and then continuing the loop on regular intervals. If no message gaps are found, the next step is to see if older message gap indications are still valid (i.e. that the missing messages haven't since been received (23). If messages have been received that fill in gaps in the message number sequences, the incorrectly marked message gaps are cleared.

What is claimed is:

1. A parking space monitoring system for handling various parking space management conditions, comprising:

a parking space monitoring device for a parking space;

a piece of electronic equipment having a plurality of microprocessors located within the parking space monitoring device, wherein the microprocessors are configured to monitor and respond to the various parking space management conditions of the parking space monitoring system;

a power control mechanism configured to provide power to the piece of electronic equipment and the plurality of microprocessors;

a mobile computer having a Global Positioning System (GPS) wherein the (GPS) reports in near real-time a current geographical location of the mobile computer;

a remote processing center and communication network, wherein the mobile computer and the parking space monitoring device are communicably connected to the remote processing center by the communication network; and wherein the remote processing center and the parking space monitoring device are configured for dynamically determining a dynamic priority of a prospective response to various parking space management conditions, that match with parking management goals of a parking manager of the parking space monitoring system, based upon pre-determined parking space management characteristics of the parking space, the current geographical location of the mobile computer, historical various parking space conditions, and historical parking space management characteristics where the dynamically determining the dynamic priority comprises weighing at least one of the various parking space management conditions that reflects the parking management goals of the parking manager including a citation fine amount, violation type, type of equipment failure, historical usage rates in a location being monitored, meter rates, time in violation, current duration of equipment failure, type of residential or commercial parking location, charged parking rates, parking demand, turnover, parking time limits, violation fine levels, and historical violation durations, and other metrics effecting near real time exceptions from the predetermined parking space management characteristics of the parking space and which exceptions are actionable in near real time based on the current geographical location, of the mobile computer effecting a value maximizing response by a field personnel using the mobile computer maximizing the parking management goals.

2. The parking space monitoring system as in claim 1, further comprising a power supply and solar cells for supplementing additional power shared with at least one external device including parking meters, digital signage and other types of related user interfacing devices.

3. The parking space monitoring system as in claim 1 wherein the prospective response to the various parking space management conditions comprises current violations, maintenance issues or meter collection requirements.

4. The parking space monitoring system as in claim 1 wherein the (GPS) of the mobile computer reports the current geographical location of the mobile computer in order to receive instructions from the remote processing center with respect to current violations, maintenance issues or meter collection requirements that are most proximate to the field personnel using the mobile computer.

5. The parking space monitoring system as in claim 1 wherein the (GPS) of the mobile computer reports the current geographical location of the mobile computer in order to receive instructions from the remote processing center with respect to current violations, maintenance issues or meter collection requirements that are highest priority.

6. The parking space monitoring system as in claim 1, further comprising a plurality of mobile computers used by field personnel of the parking space monitoring system, wherein the mobile computers and remote processing center are arranged so that remote access is provided for observation of a location of each of the field personnel in a monitored parking space, based on at least part of aggregate data, and identification of an emergent condition at a different location and for direction of a field personnel to the different location in response to identification of the emergent condition.

7. The parking space monitoring system as in claim 1, further comprising a separate device employing at least one of an induction loop, magnetometer, RADAR, ultrasonic, infrared viable means, and a radio, said separate device monitoring a parking space's occupancy and communicates the parking space's occupancy status either directly through at least one of the radio, the communication network to which the separate device is connected, and by the remote processing center.

8. The parking space monitoring system as in claim 7 wherein the separate device is installed below grade in the parking spaces of said parking space monitoring system.

9. The parking space monitoring system as in claim 7 wherein the separate device is installed in the parking space monitoring device.

10. The parking space monitoring system as in claim 1, wherein the parking space management conditions include at least one of the following conditions: Space Occupancy; Parking Meter Status; Display of Parking Policy to Motorists; Motorist User Interactions; Maintenance User Interactions; Radio Communications with a Central Management System and Network; and coordination of the operation between the plurality of microprocessors.

11. The parking space monitoring system as in claim 1 wherein the networked mobile computers and remote processing center are arranged so that remote access is provided for observation of a location of each worker in a monitored parking space, based at least in part on the last transmission of GPS data, and identification of an emergent condition at different locations and for direction of a worker to the different location in response to identification of the emergent condition.

12. The parking space monitoring system as in claim 1 wherein the parking management goals comprise revenue maximization and space availability maximization.

* * * * *